United States Patent [19]

Davenport

[11] Patent Number: 4,890,638
[45] Date of Patent: Jan. 2, 1990

[54] COVER FOR BACKFLOW PREVENTION DEVICE

[76] Inventor: Ronald D. Davenport, 3221 Earhart Rd., Hermitage, Tenn. 37076

[21] Appl. No.: 304,787

[22] Filed: Jan. 31, 1989

[51] Int. Cl.⁴ .............................................. F16K 27/08
[52] U.S. Cl. .................................... 137/382; 137/377; 52/262; 52/302
[58] Field of Search ............. 52/262, 264, 302, 19–21; 137/356, 381, 382, 371, 363, 364, 377

[56] References Cited

U.S. PATENT DOCUMENTS

| | | | |
|---|---|---|---|
| 3,170,269 | 2/1965 | Dunnington | 52/302 |
| 3,702,045 | 11/1972 | Selvaag | 52/302 |
| 3,822,521 | 7/1974 | Lucas | 52/264 |
| 3,968,601 | 7/1976 | Brown et al. | 52/21 |
| 4,556,080 | 12/1985 | Picaud | 137/377 |
| 4,630,418 | 12/1986 | Degut | 52/264 |

*Primary Examiner*—A. Michael Chambers
*Attorney, Agent, or Firm*—Harrington A. Lackey

[57] ABSTRACT

A protective enclosure for a backflow prevention device including a rectangular cover member having insulated top and side walls secured to a platform member to completely enclose the backflow prevention device. One of the side walls is provided with a drain opening adjacent the platform member and a closure member hinged above the drain opening and biased to a closed position. In large cover members, the side walls are sub-divided into removable side panels to facilitate access to the interior space within the cover member and also to facilitate assembly and disassembly.

10 Claims, 4 Drawing Sheets

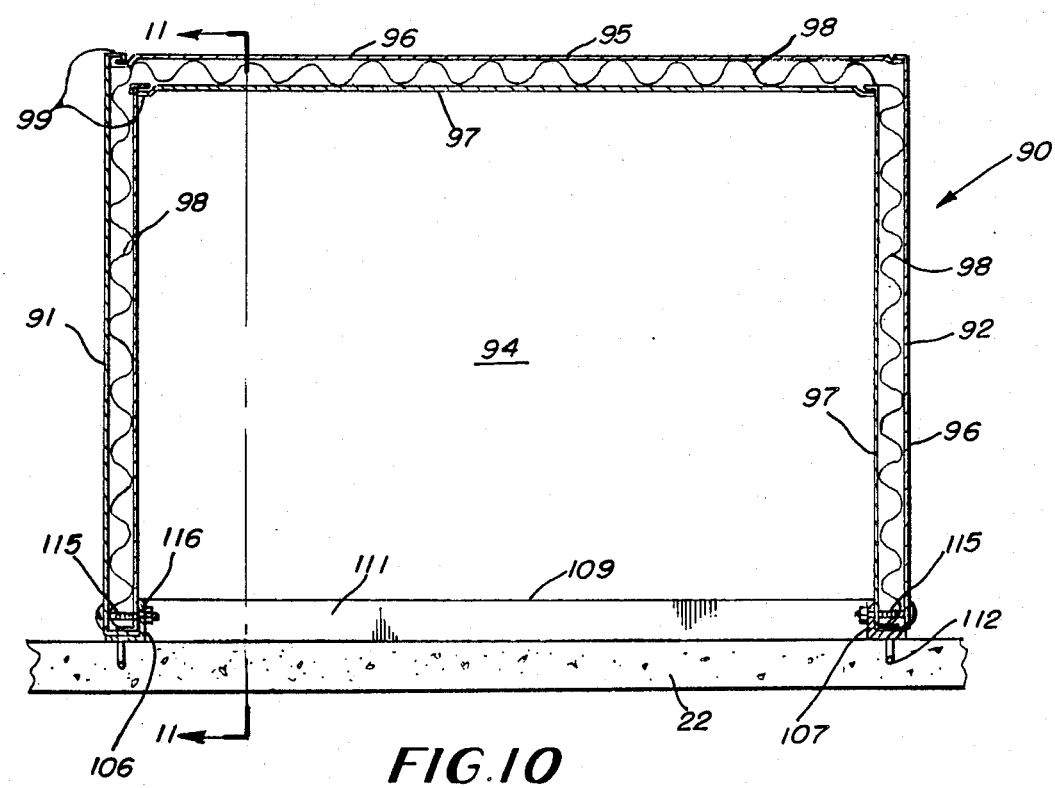
FIG.10
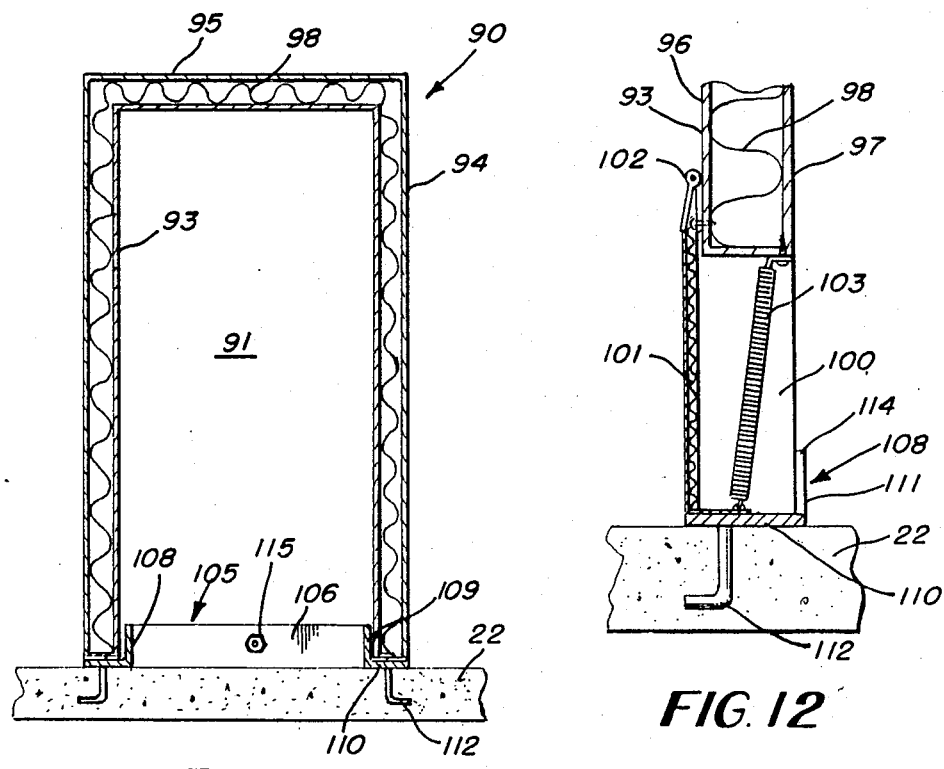
FIG.11
FIG.12

COVER FOR BACKFLOW PREVENTION DEVICE

BACKGROUND OF THE INVENTION

This invention relates to a protective enclosure for a backflow prevention device, and more particularly to a prefabricated insulated, protective enclosure for a backflow prevention device.

A backflow prevention device is an assembly of one or more check valves incorporated in a liquid supply line to prevent the backflow of any of the liquid, and particularly contaminated liquid, into the original uncontaminated supply line. Since these backflow prevention devices are usually installed in a water supply line outdoors and above ground, it is important that the devices be enclosed and protected from the weather, and particularly from freezing.

Heretofore, large concrete or cast iron boxes have been constructed around the backflow prevention device. A cover member or door is provided in the top of the box to provide the only access into the interior of the box for servicing the device. Open drain holes are formed in the lower portions of the side or end walls of the box to drain any water collecting within the box away from the box. Occasionally loose insulation material is placed within the box in an attempt to insulate the backflow prevention device.

Because of the size of the backflow prevention devices and the boxes, the top cover or door renders access within the interior of the box difficult.

Furthermore, because of the open fixed drain holes in the concrete or iron boxes, it is just as easy for water or other foreign objects to move from the outside through the drain holes into the interior of the box as it is for water to discharge through the drain holes. Furthermore, cold air can easily pass into the interior of the box through the drain holes, which can hasten the freezing of the water within the pipes and valves of the backflow prevention device.

Another cover device for partially enclosing a backflow prevention device is disclosed in the Devine U.S. Pat. No. 4,726,394 issued Feb. 23, 1988, for "HEATED COVER FOR PIPELINE BACKFLOW PREVENTER COMPONENT ASSEMBLY". This cover member includes several side sections including segments of the top wall adapted to be joined along certain longitudinal and transverse lines and clamped together on opposite sides of the backflow prevention device. The Devine cover member includes openings 44 in the top portion of the cover member to permit the valve stems 24 to project upward above the top of the cover member. The valve stems 24 support hand wheels 25 located above and on the outside of the cover member to facilitate controlling the valves from the outside of the cover member. The walls of the Devine cover member are insulated, and a drain opening 40 is provided in the end walls to permit drainage of liquid from the space within the cover member to the outside. The drain openings 40 are covered by flexible flaps 42 which will flex outwardly to permit to flow outwardly.

In spite of the coverage provided by the Devine cover member, nevertheless, the stem openings 44 provide passages for air into the cover chamber, and the stems 24 function as heat conducters permitting heat loss from the backflow prevention device to the outside of the cover member.

SUMMARY OF THE INVENTION

It is therefore an object of this invention to provide a pre-fabricated protective enclosure for a backflow prevention device in which the pre-fabricated walls are thermally insulated and the interior of the enclosed space is readily accessible at a lower elevation than the top of the enclosure.

It is a further object of this invention to provide a protective enclosure for a backflow prevention device having a drain opening which is automatically covered or closed when water is not draining through the drain opening.

It is a further object of this invention to provide a pre-fabricated protective enclosure for a backflow prevention device in which the walls are not only insulated, but are also lightweight to facilitate handling, and assembly and disassembly of the enclosure relative to the backflow prevention device.

Another object of this invention is to provide a protective cover which will completely enclose a backflow prevention device to minimize danger of frozen pipes and valves within the device.

A further object of this invention is to provide in a protective enclosure for a relatively large backflow prevention device a plurality of removable side walls to facilitate access to the enclosure space through the sides of the cover member and also to facilitate assembly, disassembly storage and transportation of the parts of the enclosure

BRIEF DESCRIPTION OF THE DRAWINGS

FIG. 10 is an enlarged, longitudinal sectional elevation taken along the line 10—10 of FIG. 8, with the backflow prevention device removed;

FIG. 11 is a fragmentary section taken along the line 11—11 of FIG. 10, but disclosing the entire end wall portion; and FIG. 12 is an enlarged fragmentary section taken along the line 12—12 of FIG. 9, but illustrating the cover member base frame and platform member assembled.

DESCRIPTION OF THE PREFERRED EMBODIMENTS

Figure 1:
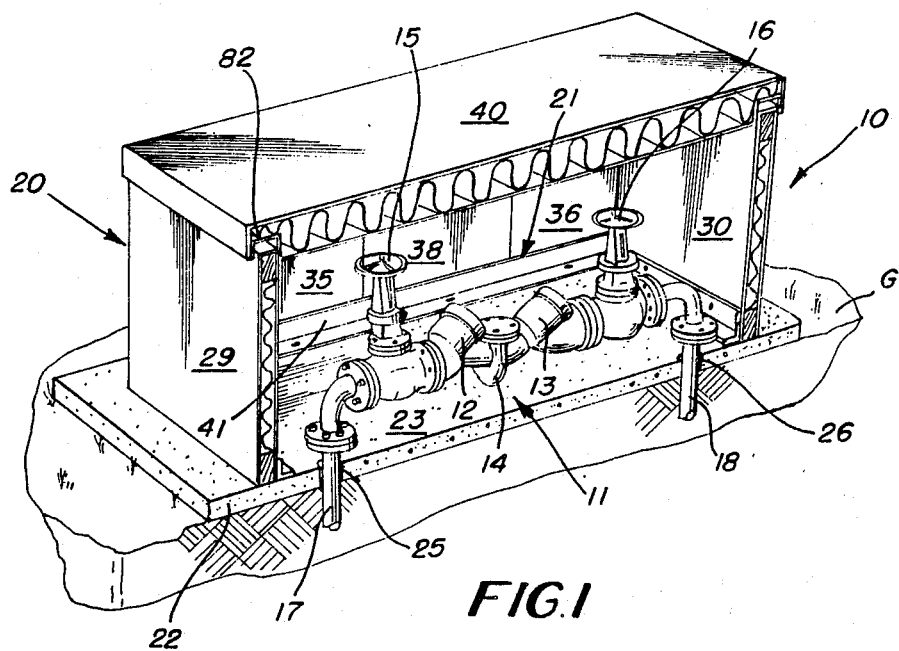
FIG. 1 is a top, side perspective view of a preferred form of a protective enclosure for a backflow prevention device, made in accordance with this invention, with portions broken away to reveal the interior space of the enclosure.

Referring now to the drawings in more detail, FIGS. 1–7 disclose the preferred embodiment of a protective enclosure 10, of a large size, for a backflow prevention device 11 (FIG. 1). The backflow prevention device 11 disclosed in FIG. 1 includes a pair of check valves enclosed within the check valve housings 12 and 13, a relief valve enclosed within the relief valve housing 14, a pair of cut-off valves and handles or hand wheels 15 and 16, and an inlet pipe 17, and an outlet pipe 18 continuing into the ground G.

The protective enclosure 10 basically includes a cover member 20, a rectangular base frame 21 and a platform member 22. The platform member 22 may be pre-fabricated, or it may be poured in situ upon the ground G so that its top floor surface 23 is planar and level. If poured in situ, the platform member may be made of concrete and poured around the inlet pipe 17 and the outlet pipe 18 to form the inlet and outlet pipe holes or openings 25 and 26.

The cover member 20 disclosed in FIGS. 1–7 includes a pair of end panels 29 and 30. The cover member 20 also includes a pair of opposed side walls including a pair of removable side panels 33 and 34 and 35 and 36 on opposite sides of the cover member 20 and a pair of access panels 37 and 38, which when assembled are in coplanar relationship on the opposite sides of the cover member 20. The cover member 20 further includes a removable rectangular top wall or top wall member 40. The height of each of the end panels 29–30, the side panels 33–36 and the access panels 37–38 is greater than the height of the device 11 and particularly the height of the cut-off valve handles 15–16.

The rectangular base frame 21 is large enough to fit around the backflow prevention device 11, as disclosed in FIG. 1. Moreover the rectangular base frame 21 is formed from elongated side angle members 41 and 42 and end angle members 43 and 44. The angle shape of each of the side and end members 41–44 includes a bottom horizontal flange 45 and an outer vertical flange 46. The horizontal bottom flanges 45 of each of the angle pieces 41–44 are secured to the top surface 23 of the platform member 22 by appropriate concrete fasteners, such as the bolts 47.

Each of the removable side panels 33, 34, 35, and 36 is constructed of a sheet metal envelope including a telescoping outer metal skin member 49 and an inner metal skin member 50 encapsulating a wooden frame work, such as the upper and lower transverse redwood frame members 51 and 52 (FIG. 5) and end frame member or post 53 (FIG. 4), and a relatively thick insulating layer 54. The insulating layer 54 may be made of insulation material, such as polyisocyanurate, having a substantially high R-value, such as an R-value of 8.4. Each of the removable side panels 33, 34, 35, and 36 is rectangular with substantially square edges.

Figure 7:
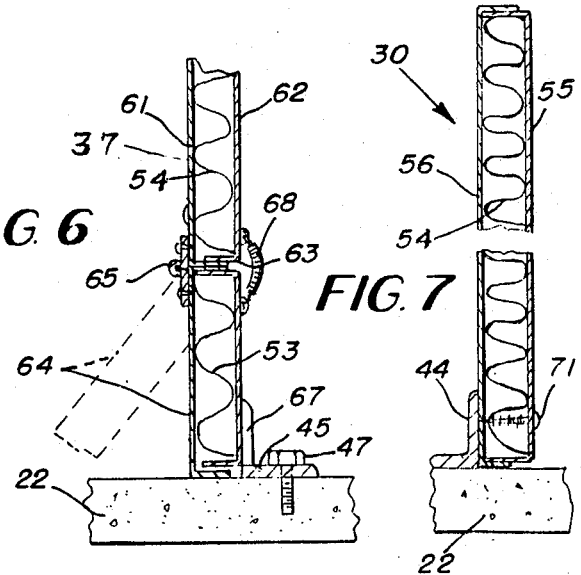
FIG. 7 is an enlarged fragmentary section taken along the line 7—7 of FIG. 4, with portions broken away.

Each of the end panels 29 and 30 is also rectangular to define the entire end walls of the cover member 20. Each end panel 29 and 30 is also provided with vertical end channels 31 for receiving the corresponding end portions of the side panels 33, 34, 35, and 36. Each of the end panels 29 and 30 have substantially the same construction as the side panels 33–36, including the outer metal cladding composed of telescoping outer and inner metal skins 55 and 56 encapsulating thick insulating material 53, as illustrated in FIG. 7. No wooden framework is normally included in the end panels 29 and 30.

Figure 6:
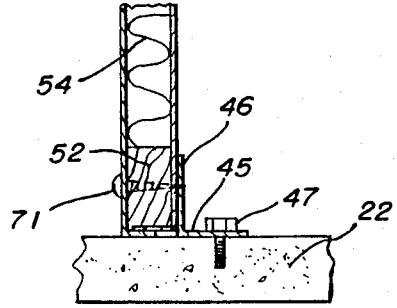
FIG. 6 is an enlarged fragmentary section taken along the line 6—6 of FIG. 3, with the closure member disclosed in its closed position in solid lines, and in its open position in phantom.

The access panels 37 and 38 are of substantially the same construction as the side panels 33–36, except no wooden frame members are necessary. Each access panel includes the same metal cladding 61 and 62 encapsulating the insulation layer 53, as illustrated in FIG. 6.

One of the access panels, such as the panel 37, is provided with a transverse drain opening 63 in its bottom end portion covered by a hinged closure member or flap 64. The closure member 64 is supported by a transverse hinge member 65 secured to the outer surface of the lower portion of the metal skin 61 and to the upper surface of the drain flap 64 in such a manner that the closure member or flap 64 may swing between its closed position disclosed in solid lines in FIG. 6 in coplanar vertical relationship with the access panel 37 and an outer open position disclosed in phantom in FIG. 6.

The drain flap or closure member 64 is also preferably constructed of the same metal cladding or sheathing as the cladding 61 and 62, encapsulating a thick layer of the insulating material 53.

Figure 2:
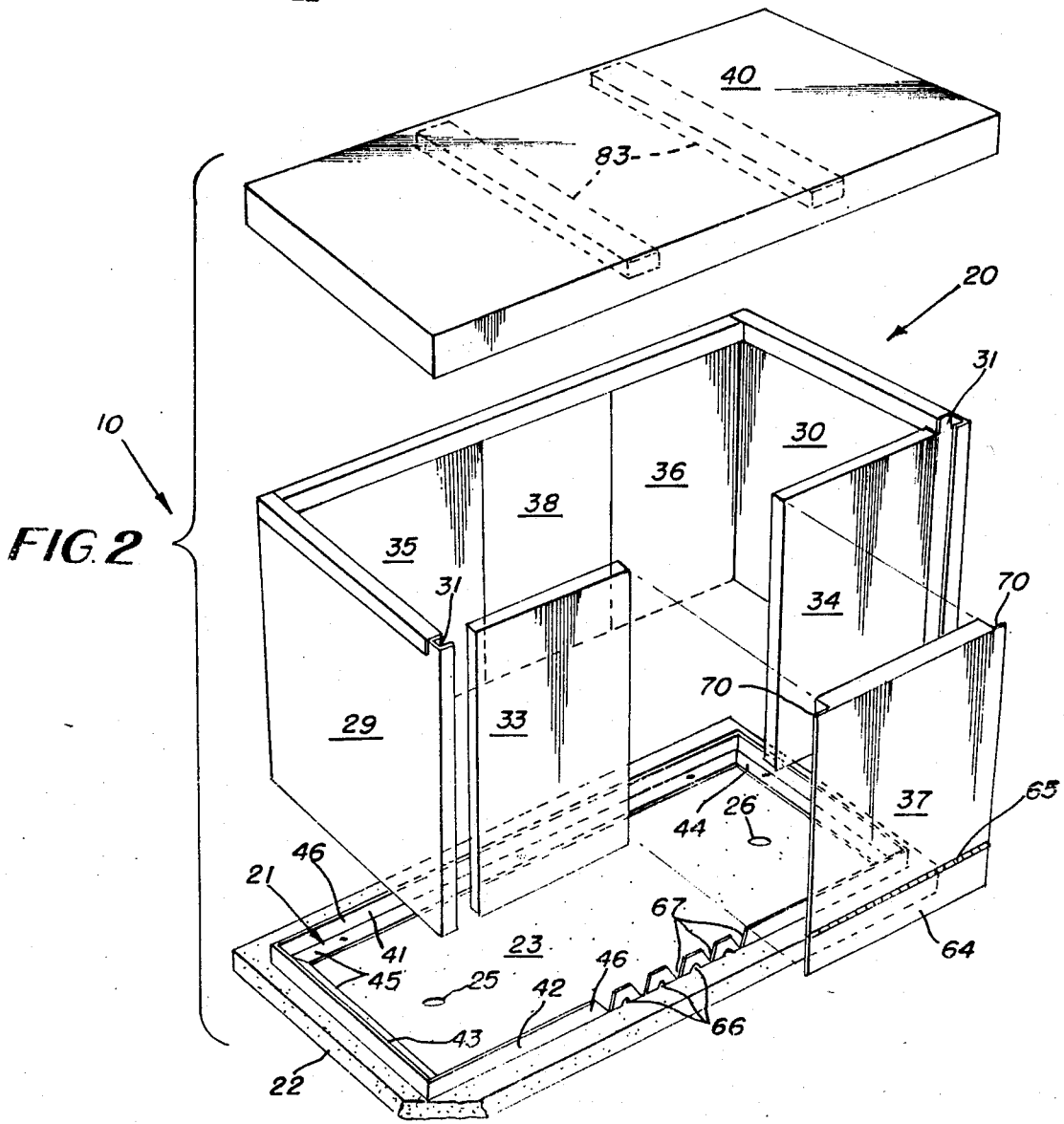
FIG. 2 is a top, side, exploded, perspective view of the enclosure disclosed in FIG. 1 with the two side panels and the access panel on the near side removed.

As best disclosed in FIG. 2, a plurality of drain ports or apertures 66 are formed in the vertical flange member 46 of the side angle member 42. Some of these drain opening 66 may take the form of notches 67 cut all the way downward to the horizontal angle flanges 45, so that any water trapped within the rectangular frame 21 is free to flow through the notches 67 and the ports 66 when the drain flap 64 is in its open, phantom-line position disclosed in FIG. 6.

Furthermore, after the interior of the frame member 21 has been satisfactorily drained, the drain flap 64 is released and returned to its vertical, closed position by a biasing action of the return coil spring 68, illustrated in FIG. 6.

The outer metal skin 61 of both access panels 37 and 38 project laterally from the vertical edges of the access panels 37 and 38 to form outer vertical lips or ledges 70 for abutting flush against the corresponding outer vertical edge surfaces of the adjacent side panels 33–36.

Figure 5:
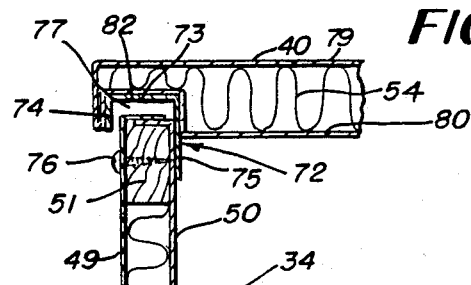
FIG. 5 is an enlarged fragmentary section taken along the line 5—5 of FIG. 3.

All of the end panels 29 and 30, the side panels 33–36, and the access panels 37 and 38 are of equal height, and the lower edge portions are adapted to be secured against the vertical flanges 46 of the angle frame 21 by appropriate fasteners, such as the bolts or screws 71, (FIGS. 5 and 7).

Mounted upon the top edge of each of the end panels 29 and 30, the side panels 33–36, and the access panels 37 and 38 is an elongated continuous unequal leg channel 72, as illustrated in FIG. 5. The unequal leg channel 72 includes an elongated horizontal web 73. Depending from the outside edge of each web 73 is a front depending flange 74. From the rear edge of each web 73 is a rear flange 75 projecting farther downward than the front flange 74. The depending rear or inside flange 75 is secured to the inside surface of each of the side and end walls by an elongated sheet metal screw or other appropriate fastener 76 so that the web 73 is spaced above the top edge of each corresponding end or side wall to provide the space 77.

The top wall 40 is constructed in a similar manner to the end and side walls in that the top wall 40 has a solid horizontal top metal cladding or skin 79 and a parallel bottom cladding or skin 80 encapsulating a relatively thick layer of thermal insulation material 53. Also formed in the perimeter of the bottom of the top wall 40 is a rectangular channel-shaped recess or groove 82 which is adapted to seat upon the unequal leg channels 72, as illustrated in FIG. 5.

If desired, the top wall 40 may include reinforcing transverse redwood beams 83 illustrated by hidden lines in FIG. 2.

Because of the spacing between the web 73 of the unequal leg channel 72 and the top edge of each of the corresponding outside panels 33–36, any of the side panels 33–36 is readily removable by simply unfastening the threaded fastener members 76 and 71 secured to the side panel 33–36. After the fasteners are removed, the particular side panel, such as the side panel 33, which is desired to be removed, is elevated to occupy the space 77 above the top edge of the side panel 33 and then the bottom edge may be pulled outwardly to separate the side panel 33 from the cover member 20, without binding the bottom edge of the side panel 33 upon the floor 23 of the concrete platform member 22.

As illustrated in FIG. 2, the cover member 20 may be easily positioned on the end panels 29–30, side panels 33–36, and access panels 37–38.

After the platform member 22 has been formed about the backflow prevention device 11, the rectangular frame 21 is assembled by securing each of the elongated angle members 41–44 to the platform member 22 by the anchor bolts 47, so that the angle members 41–44 occupy the rectangular shape disclosed in the drawings.

Next, the end panels 29 and 30 are placed in an upright, vertical position adjacent the outsides of the end angle members 43 and 44 and secured to the vertical flanges 46 of the end angle members 43 and 44 by the appropriate number of fastener members 71.

Then, the side panels 33–36 are fitted against the outsides of the vertical flanges 46 of the corresponding side angle members 41 and 42 and within the corresponding end channels 31 in the end panels 29 and 30, and secured to the vertical flanges 46 by the fastener members 71.

Figure 3:
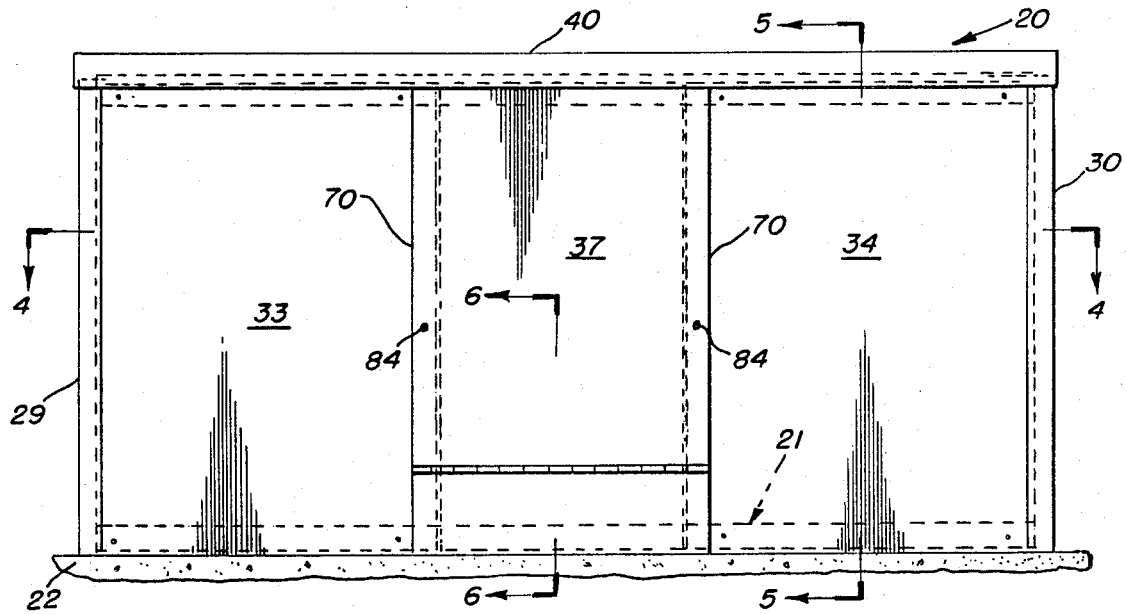
FIG. 3 is a near side elevation of the enclosure disclosed in FIGS. 1 and 2, with the platform member disclosed fragmentarily and in section.
Figure 4:
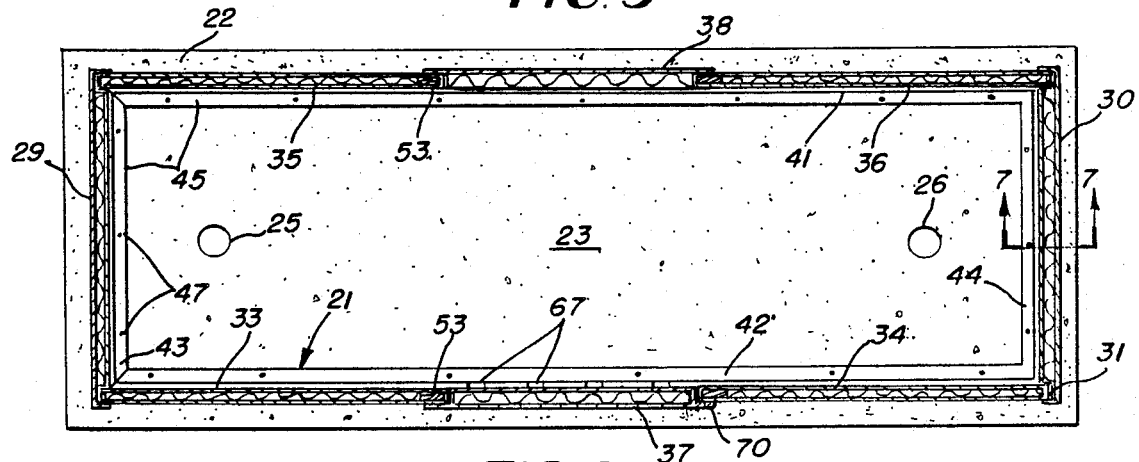
FIG. 4 is a plan section taken along the line 4—4 of FIG. 3.

Then, the access panels 37 and 38 are fitted into the openings left between the opposed sets of side panels 33–34 and 35–36 until the lips 70 lie flush against the corresponding outside edge portions of the side panels 33–36, and secured to the opposed panels by the sheet metal screws 84, as disclosed in FIG. 3.

The top wall or panel 40 is then lowered into position so that its downward opening elongated recesses 82 are seated upon the horizontal web 73 of the unequal leg channel 72.

The cover member 20 then completely encapsulates the backflow prevention device 11 to protect it against freezing, other elements of the weather, and dirt and debris. Moreover, the cover member 20 conceals the backflow prevention device 11 from view, for aesthetic reasons and also to discourage against tampering.

Figure 8:
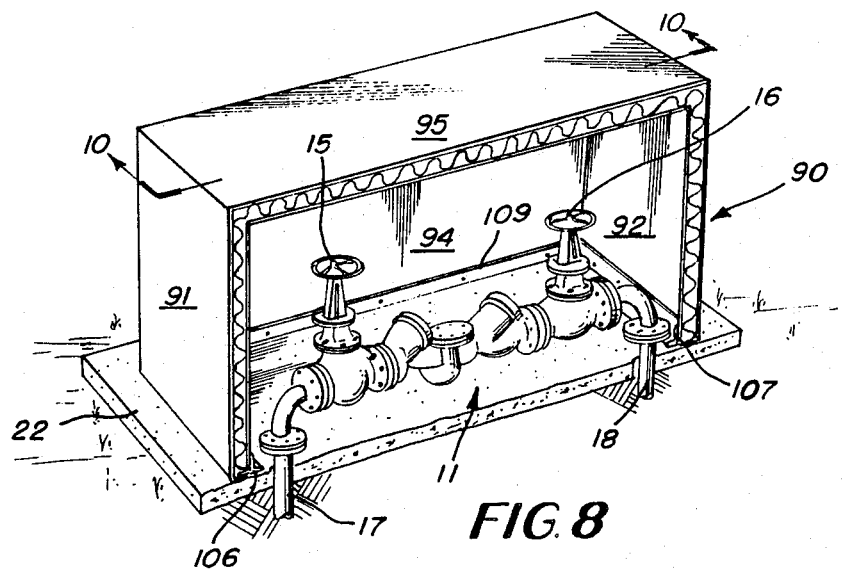
FIG. 8 is a top, side perspective view of a modified form of a protective enclosure, with portions of the near side broken away to reveal the interior space.

FIGS. 8–12 disclose a modified cover member 90 adapted to completely conceal a backflow prevention device 11, as illustrated in FIG. 8. The cover member 90 includes integral end walls 91 and 92 and side walls 93 and 94 and a top wall 95, with an open bottom. The height of the end walls 91–92 and the side walls 93–94 is greater than the overall height of the backflow prevention device 11. Each of the walls 91–95 is made from similar type outer and inner metal cladding or skins 96 and 97 similar to those disclosed in the cover member 20 and encapsulating only corresponding layers of thermal insulation material 98 of high R-values.

As disclosed in FIG. 10, the corners of the various panels 91–95 may be joined together by a conventional "Pittsburg lock" 99, if desired.

The side wall 93 of the cover member 90 is provided in its lower edge portion with a drain opening 100 covered by the hinged drain flap 101, as best disclosed in FIG. 12. In a manner similar to the mounting of the drain flap 64, the drain flap 101 is pivotally connected to a portion of the side wall 93 above the drain opening 100 by a transverse hinge member 102. Moreover, the drain flap 101 is biased toward its closed position, as disclosed in FIG. 12, by an elongated coil spring 103.

The cover member 90 is secured around the backflow prevention device 11 upon the same concrete foundation or platform member 22, as disclosed in FIGS. 1–7, by a rectangular frame 105 also made up of elongated angle members 106, 107, 108, and 109. However, each of the angle members 106, 107, 108, and 109 has its bottom horizontal flange 110 projecting laterally outward from its vertical flange 111.

The horizontal flanges 110 are secured to the concrete platform member 11 by anchor hooks 112, which are preferably pre-welded to the bottom surfaces of the horizontal flanges 110 and imbedded in the concrete platform member 22 before the concrete is poured or before it has set.

The elongated side angle member 108 is provided with drain openings or apertures or ports 113 formed through the lower portion of the vertical flange 111 in the side angle member 108 in registry with the drain opening 100 in the side wall 93. The drain ports may also include a drain notch 114, as disclosed in FIGS. 9 and 12, cut entirely down to the surface of the corresponding horizontal flange 110 to facilitate drainage.

The cover member 90 is of a substantially smaller size than the cover member 20, and therefore, may be integrally formed, as shown, to facilitate handling, assembly, and disassembly.

Figure 9:
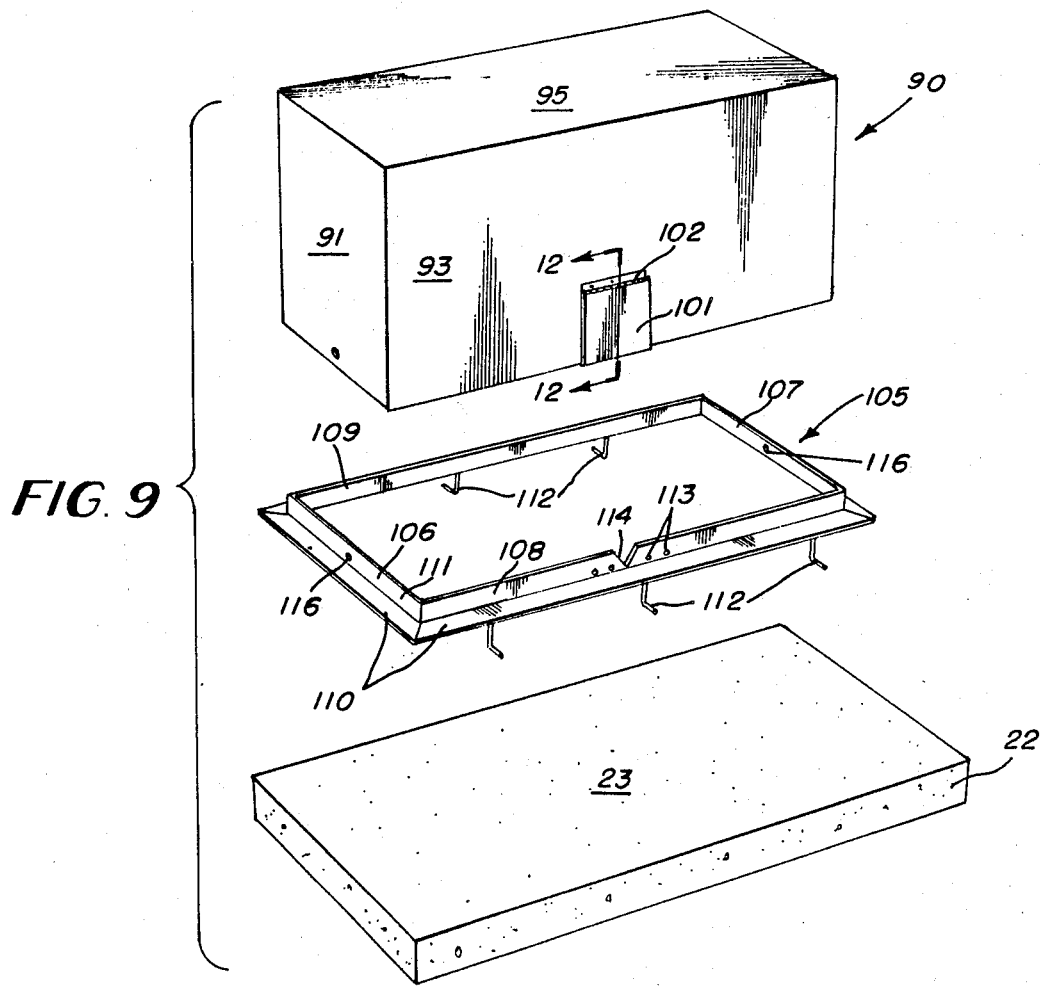
FIG. 9 is a top, side, exploded perspective view of the apparatus disclosed in FIG. 8.

When the angle frame 105 is provided with the anchor members 112, then a platform member 22 must be formed around the anchor members 112 after the rectangular frame 105 has been positioned around the backflow prevention device 11. After the frame 105 is installed and the concrete of the platform member 22 has set, the sole remaining step for enclosing the backflow prevention device 11 is to position the cover member 90 as a unit over the top of the device 11 and to seat the bottom edges of the end and side walls 91–94 upon the horizontal flanges 110 of the frame 105. The bottom edge portions of one or more of the end and side walls 91–94 may be secured to the vertical flanges 111 of the rectangular frame 105 by appropriate fasteners, such as sheet metal screws or bolts 115. As illustrated in FIGS. 9 and 10, the fastener bolts 115 are inserted inwardly through the lower portions of the end walls 91 and 92 into corresponding holes 116 in the end angle members 106 and 107.

When it is desired to drain the interior of the space within either of the cover members 20 or 90, it is only necessary for the operator to pivot outwardly the corresponding drain flap 64 or 101 against the resistance of the corresponding spring 68 or 103 and hold the flap 64 or 101 in its outward open position, as illustrated by the phantom position of the flap 64 in FIG. 6, until all the water has been drained from the interior of the respective housings. Moreover, the weight and pressure of the water within the housing may be sufficient to force the flap 64 or 101 open against the action of the corresponding spring 68 or 103 to effect adequate drainage.

After the draining has been completed, the flaps 64 and 101 are released and the respective springs 68 and 103 restore the corresponding closure members or flaps to their respective closed positions as disclosed in solid lines in FIGS. 6 and 12 respectively.

Access to the interior of the cover member 20 may be obtained in a variety of ways, in order to inspect or service the backflow prevention device 11. In the cover member 20, the top wall 40 may be raised and removed. However, the interior of the space around the backflow prevention device 11 is more accessible by removing either of the access panels 37 and 38 or one or more of the side panels 33–36 as the removal of these panels has been previously discussed. The access panels 37 and 38 may be removed merely by removing the connecting sheet metal screws 84.

The side panels 33 and 34 may be removed by first removing the access panels 37 and 38 by removing the screws 84, and then removing the bottom screws 71 and 76. Then the desired side panel, such as 33, is then raised and pulled outwardly to completely separate the side panel 33 from the cover member 20.

In order obtain access to the interior of the cover member 90 it is only necessary to unscrew the end fasteners 115 from the rectangular frame 105 and raise and remove the entire cover member 90 to obtain full access to the backflow prevention device 11.

However, when the cover members 20 and 90 are fully installed upon the platform members 22, the backflow prevention device 11 is entirely and completely enclosed by solid insulated walls without any openings which can be penetrated by cold air or any other weather elements.

What is claimed is:

1. A protective enclosure for a backflow prevention device including a check valve assembly in fluid communication with an inlet pipe and an outlet pipe, comprising:
   (a) an elongated platform member having a substantially planar level floor surface mounted upon the ground beneath the backflow prevention device, and having an opening through said platform member for the passage of each inlet pipe and each outlet pipe into the ground,
   (b) an elongated cover member having a top wall and connecting side walls having bottom edge portions resting upon said floor surface, the height of said side walls being greater than the height of the backflow prevention device above said floor surface, so that said cover member and said platform member enclose a space receiving the entire backflow prevention device,
   (c) a drain opening through the bottom edge portion of one of said side walls adjacent said floor surface,
   (d) a closure member large enough to cover said drain opening,
   (e) hinge means connecting said closure member to said side wall adjacent said drain opening for swinging movement between a closed position covering said drain opening and an open position away from said drain opening, and
   (f) means biasing said closure member to said closed position.

2. The invention according to claim 1 in which said open position is outside said side wall.

3. The invention according to claim 1 in which said biasing means comprises spring means.

4. The invention according to claim 1 further comprising an endless open base frame having the same shape as the bottom edge portions of said side walls, anchor means securing said base frame to said platform member, and fastener means securing said base frame to said bottom edge portions.

5. The invention according to claim 4 in which said side walls comprise opposed side walls and opposed end walls defining a horizontal, rectangular shape, said base frame being of the same rectangular shape and being formed of elongated angle members having horizontal and vertical flanges, said anchor means securing said horizontal flanges to said platform member and said fastener means securing said bottom edge portions to said vertical flanges.

6. The invention according to claim 5 in which said vertical flanges are mounted on the inside of and adjacent said side and end walls, a portion of said vertical flange intercepting said drain opening having drain ports in fluid communication with said drain opening.

7. The invention according to claim 5 in which said side walls comprise a plurality of substantially coplanar, removable side panels having vertical opposed end edges.

8. The invention according to claim 7 in which one of said side panels, comprises an access panel, said drain opening being formed in the bottom edge portion of said access panel, and said hinge means being fixed transversely across the outside of said access panel above said drain opening.

9. The invention according to claim 5 in which said side walls and said end walls comprise top edge portions at substantially the same elevation and said top wall comprises a rectangular depending channel member opening downward along the rectangular perimeter of said top wall to receive said top edge portions of said side and end walls.

10. The invention according to claim 9 further comprising a rectangular uneven leg channel frame opening downward and having a horizontal web and outside and inside flanges depending from said web, said inside flange projecting downward farther than said outside flange, means securing said inside flange to said side and end walls to space said web above said top edge portions to permit said side panels to be removed from said cover member without disturbing said top wall.

* * * * *